United States Patent

[11] 3,613,920

| [72] | Inventor | James R. Flamm<br>227 E. Main, Rexburg, Idaho 83440 |
|---|---|---|
| [21] | Appl. No. | 12,193 |
| [22] | Filed | Feb. 18, 1970 |
| [45] | Patented | Oct. 19, 1971 |

[54] EQUIPMENT DECK AND RAMP
10 Claims, 8 Drawing Figs.

[52] U.S. Cl. .................................................. 214/85,
296/1 A, 296/3
[51] Int. Cl. .................................................. B60p 1/44
[50] Field of Search........................................... 214/85,
85.1; 298/1 A; 180/5, 5 F; 296/1 A, 3, 10, 32, 33,
34, 39

[56] References Cited
UNITED STATES PATENTS
| 2,370,427 | 2/1945 | Sherry............................ | 214/85 |
| 3,536,214 | 10/1970 | Sorg............................. | 214/85 |

*Primary Examiner*—Albert J. Makay
*Attorneys*—Clarence A. O'Brien and Harvey B. Jacobson

ABSTRACT: Auxiliary support structure for a pickup truck box or the like consisting of a rectangular deck positionable between the sides of the box in overlying relation to the wheel covers and maintained by depending legs units or upwardly extending support straps for providing a full width support surface. An elongated ramp is selectively bracket engaged with the rear end of the deck for the introduction and removal of equipment. The ramp is selectively storable beneath the elevated deck.

PATENTED OCT 19 1971
3,613,920
SHEET 1 OF 2
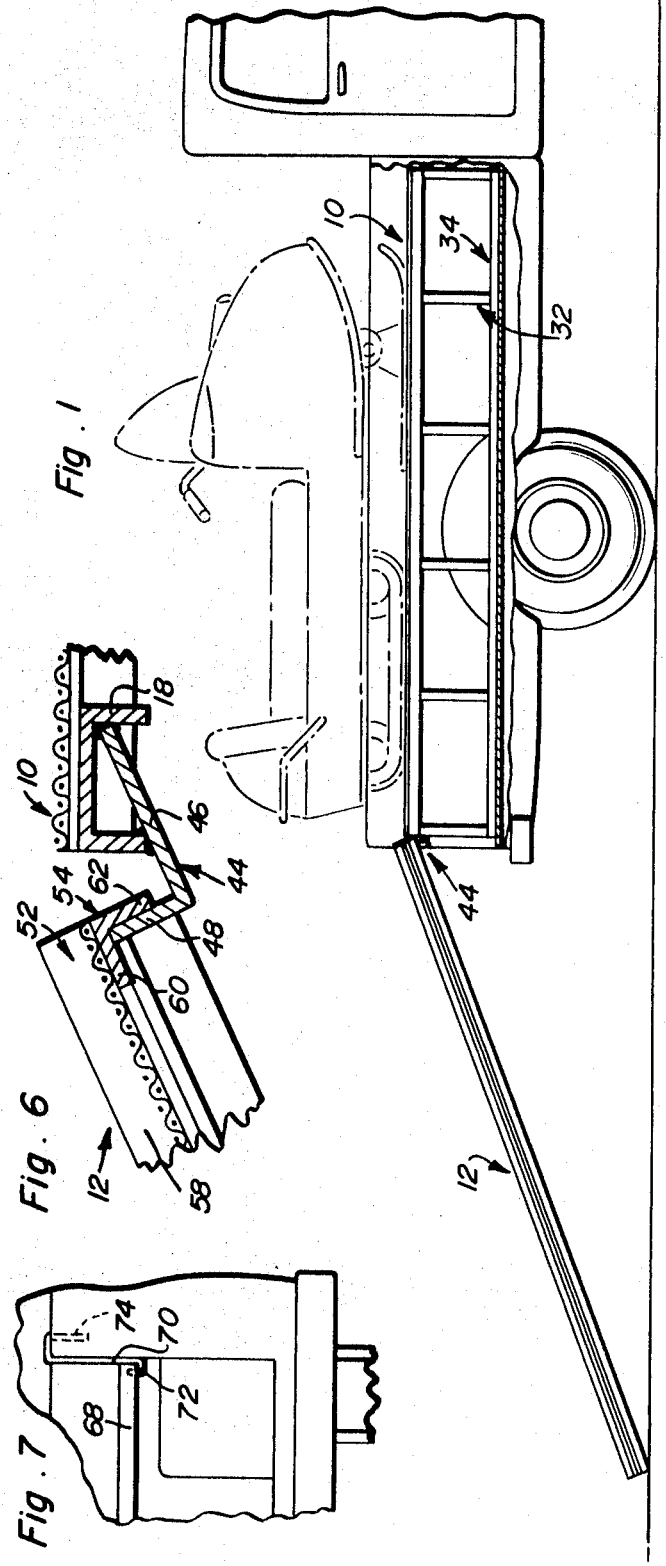
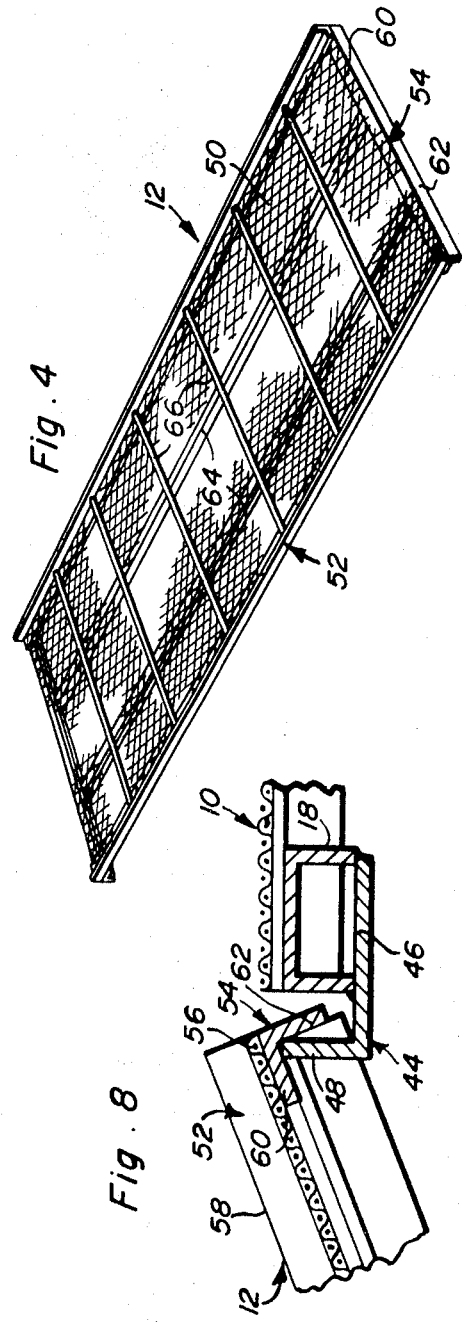
James R. Flamm
INVENTOR.
BY Clarence A. O'Brien
and Harvey B. Jacobson
Attorneys

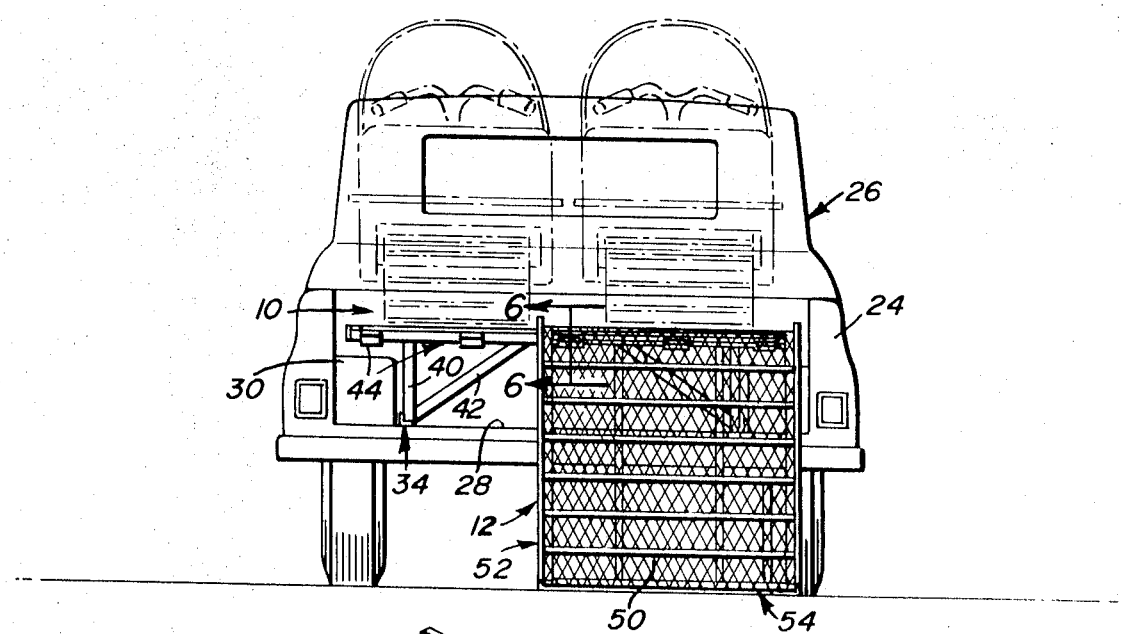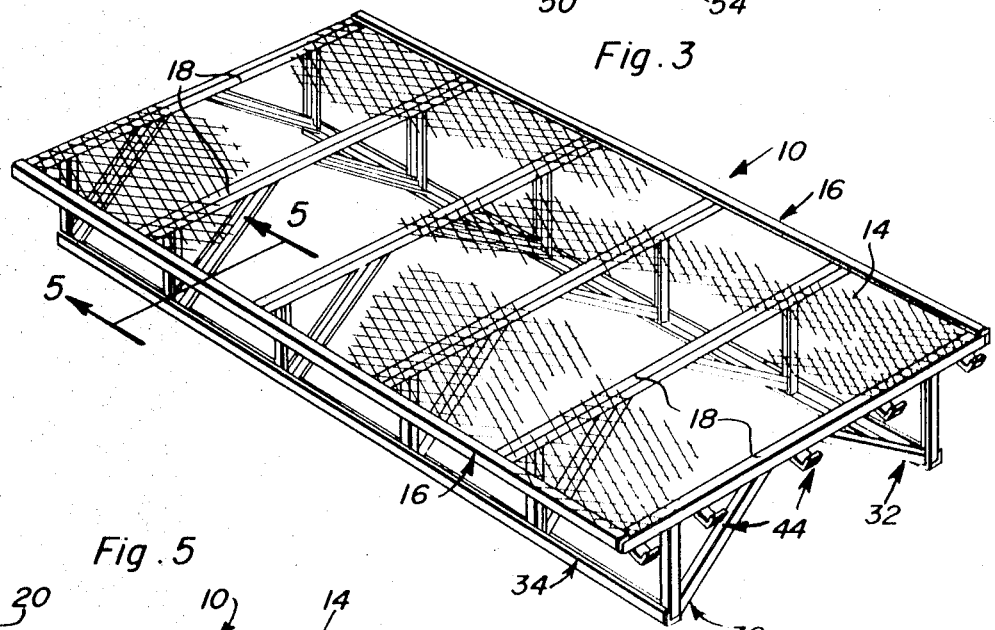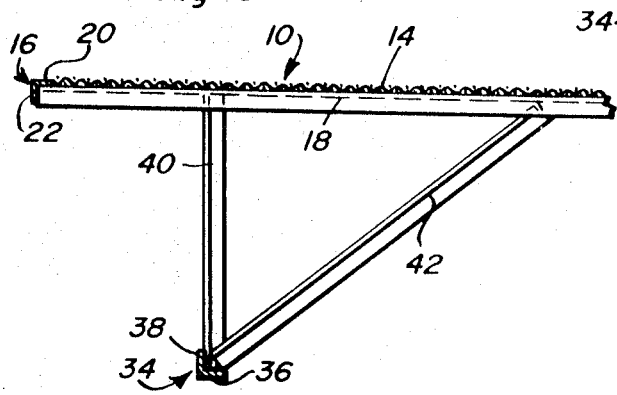

EQUIPMENT DECK AND RAMP

The instant invention is generally concerned with the provision of means for storing equipment, such as snowmobiles or the like, on pickup trucks, and more particularly relates to an auxiliary deck which increases the effective width of the pickup box, providing a continuous support surface in overlying relation to the wheel covers and other obstacles which might constitute a portion of the pickup box construction.

It is a primary object of the instant invention to provide a level elevated deck for the box of a pickup truck so as to provide a support surface wider than that of the box bed, the effective width of which is normally restricted by the opposed wheel covers or wheel housings. By increasing the effective width of the loading area of the box, equipment normally not capable of being accommodated can be received. As an example, a conventional pickup truck cannot accommodate two snowmobiles. However, with the deck of the instant invention, a pair of snowmobiles can be positioned in side-by-side relation as will be appreciated from FIG. 2.

Other advantages residing in the utilization of an auxiliary elevated deck include the provision of two separate storage or load receiving surfaces and the provision of a hidden or concealed storage area beneath the raised auxiliary deck.

Additional advantages, contemplated by the instant invention, include the provision of an auxiliary deck which requires no mechanical fasteners or the like for the installation thereof, the deck either sitting directly, through leg units, on the bed of the pickup box or being suspended from the sides thereof by appropriate hangers. Likewise, an object of the instant invention resides in the provision of a ramp selectively engageable with various portions of the rear of the deck for facilitating the movement of equipment onto and off of the deck, the ramp itself being rigid and, upon removal from engagement with the deck, being conveniently stored beneath the deck itself.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view, with portions broken away, of a pickup truck with the structure of the instant invention mounted thereon;

FIG. 2 is a rear elevational view of the invention mounted in operative position on a pickup truck;

FIG. 3 is an enlarged perspective view of the equipment receiving deck of the instant invention;

FIG. 4 is a perspective view of the equipment loading ramp of the instant invention;

FIG. 5 is an enlarged cross-sectional detail taken substantially upon a plane passing along line 5—5 in FIG. 3;

FIG. 6 is an enlarged cross-sectional detail taken substantially on a plane passing along line 6—6 in FIG. 2;

FIG. 7 is a schematic illustration of a modified manner of supporting an equipment deck; and FIG. 8 is a modification of the ramp-supporting bracket shown in FIG. 6.

Referring now more specifically to the drawings, reference numeral 10 is used to designate the equipment deck of the instant invention, while the associated ramp is designated by reference numeral 12.

The deck 10 is rectangular and includes a rigid surface sheet 14 supported on a framework consisting of a pair of laterally spaced angle iron siderails 16 and a series of transverse channel rails or beams 18 defining a pair of end beams and a plurality of intermediate beams paralleling the end beams. The end beams 18, in conjunction with the side rails 16, define an elongated rectangular frame. Each of the siderails is orientated so as to provide a horizontal flange 20 and a vertical outer flange 22 depending therefrom. The crossbeams or rails 18 open downwardly, so as to provide a flat top and laterally spaced depending flanges, and have the opposed ends thereof received beneath the horizontal angle iron rail flanges 20 and in abutting engagement with the vertical flanges 22. The rails 16 and 18 are welded together so as to provide a rigid frame for the reception of the support surface forming sheet 14.

The support surface forming sheet 14 will preferably be of an expanded metal mesh, as illustrated, welded to the frame. However, if so desired, a solid sheet of material can be used, for example sheet metal or plywood, the sheeting, regardless of the material used, being positively affixed to the frame.

The equipment deck 10 will normally be positioned within the pickup box 24 of a pickup truck 26 and orientated in spaced relation above the box bed 28 a distance sufficient so as to overlie the wheel housings or covers 30 and provide a flat support surface extending in an unobstructed manner between the opposed sides of the pickup truck box 24. In this manner, a substantially greater width load accommodating area is provided enabling, as one example, the accommodation of a pair of snowmobiles in side-by-side relation as opposed to a single snowmobile which is all that can be normally accommodated by the pickup bed 28 itself.

The deck 10 is supported or maintained in the desired elevated position by means of a pair of leg units 32 extending longitudinally along the deck 10 therebelow and in parallel inwardly spaced relation to the opposed sides thereof whereby the side edge portions of the deck 10 define lateral portions capable of overlying wheel covers 30 or the like while the inwardly spaced leg units engage and sit on the pickup box bed 28. Each leg unit 32 includes an elongated angular base rail or stringer 34 formed of angle iron with one flange 36 thereof horizontally directed and the second flange 38 thereof rising vertically therefrom along the outer edge thereof. The base rail or stringer 34 is engaged with the deck 10 by a plurality of angular uprights or legs 40, each having the upper end thereof received within one of the downwardly opening channel cross rails 18 and the lower end thereof received within and welded to the inwardly directed stringer 34. In addition, each leg is stabilized by an associated diagonal angle brace 42 welded to the lower end of the corresponding angle and the stringer 34 and extending upwardly and inwardly therefrom into engagement with the central portion of the associated crossbeam 18 to which it is also permanently affixed as by welding.

The deck 10 is completed by the provision of a series of rackets 44 at spaced points along the rearmost end beam 18. Each bracket 44 includes a relatively wide forwardly and upwardly inclined flange 46 underlying the rear one of the associated pair of beam flanges and extending into engagement with the forward beam flange immediately below the horizontal top of the beam 18. The flange 46 is rigidly welded to both flanges of this end beam 18, and is of a width so as to position the outward edge thereof in outwardly spaced relation rearward of and slightly below the end beam 18 at which point an integral upwardly and outwardly directed retaining flange 48 is provided. The flange 48 has the upper edge thereof located below the upper support surface of the deck 10.

Turning now to the ramp 12, it will be noted that the ramp is of an elongated rectangular configuration, narrower than the deck 10 and of a length so as to incline at an easily negotiable angle between the rear of the truck mounted deck 10 and the ground level. The support surface 50 of the ramp 12 is normally of the same sheeting material as the deck sheeting 14, preferably expanded metal which provides an open network for the passing of snow and dirt therethrough as the vehicle or equipment is moved up the ramp 12 and onto the deck 10. The support surface forming sheet 50 is mounted on a framework which includes angle iron side members 52 and transverse angle iron end members 54. The side members 52 have the horizontal flanges 56 thereof inwardly directed and the outer vertical flanges 58 thereof vertically directed, the opposed horizontal flanges 56 receiving the sheet like material 50 and having this material 50 secured thereto as by welding or the like, while the opposed vertical flanges 58 act as retaining rails for equipment moved on the inclined ramp 12.

The end angle members 54 have the horizontal flanges 60 thereof inwardly directed and the outer vertical flanges 62 downwardly directed so as to form a lip, noting FIG. 6 in particular, engageable over a plurality of the deck mounted brackets 44, and in particular the rearwardly and upwardly angled flanges 48 thereof. In this manner, a releasable locking of one end of the ramp 12 to the rear of the deck 10 is effected, the opposite end of the ramp 12 resting on the ground. As will be appreciated, the brackets 44 are spaced along the rear crossbeam 18 of the deck 10, and hence the ramp 12 can be effectively aligned with any portion of the deck for a positioning of the equipment thereon as desired. After the equipment is loaded, the ramp 12 can be easily disengaged from the deck and slid onto the bed 28 of the pickup box 24 between the opposed leg units 32, thus easily storing in an out of the way yet accessible position. Incidentally, referring again to FIG. 6, it will be appreciated that the bracket flanges 48 seat within the angle formed by the flanges 60 and 62 of the end cross rail 54 of the ramp 12, normally against the flange 62, so as to provide for a secure interengagement directly between the frames of the two units, the deck 10 and the ramp 12. Also, of significance is the fact that the rearward and downward inclination of the brackets 44 keeps the sharp upper edge of the ramp below the level of the deck surface, eliminating catching of skis as snowmobiles are dragged backward from the ramp and also eliminating the possibility of tearing a track as a spinning track comes to the apex of the junction.

Additional rigidity is incorporated into the ramp 12 by the provision of longitudinally extending underlying bracing rails 64 extending between and welded to the transverse end rails 54 in inwardly spaced parallel relation to the two side rails 52. These bracing rails 64 are formed of angle members with one flange horizontally orientated and forming a support surface for the sheet material 50 and with the second flange depending vertically therefrom. Finally, a series of rodlike cleats or members 66 extend between the vertical flanges 58 of the side rails 52 and overlie the surface forming material 50 for the purpose of providing additional traction to the equipment being driven or otherwise moved upwardly along the ramp 12.

Referring now to FIG. 7, the instant invention also contemplates a variation in the deck support wherein the deck, herein designated by reference numeral 68, is suspended from the opposed sides of the pickup box by a series of hangers 70, rather than being supported from the bed by the leg units 32 of the initially described form. In fact, the deck 68 will not even be provided with such leg units, thereby leaving a clear bed for loading purposes. Each of the hangers 70, a plurality of such hangers being provided along each side of the deck 68, includes an inwardly hooked or curled lower end portion 72 which engages below and about the corresponding siderail of the deck 68, and an outwardly and downwardly hooked or curled upper end portion 74 which engages in one of the normally provided stake pockets in the adjoining sidewall of the pickup box. Such hangers are of course provided along both sides of the deck 68 and provide an equalized support therefor.

Finally, noting FIG. 8, an alternate manner of mounting the brackets 44 can be effected by horizontally orientating the flanges 46 and welding them to the lower edges of the two flanges of the end beam 18.

From the foregoing, it will be appreciated that a unique structure has been defined for the increase of the effective load carrying area of a pickup truck box, in conjunction with means for loading equipment thereon. The invention, although relatively simple in construction, is particularly adapted for its intended purpose, requiring no modification of the pickup box itself and being simply mounted thereon and removed therefrom without requiring the utilization of bolts, clamps or other special mechanical features. Incidentally, while not specifically referring to supra, it will be appreciated that the use of expanded metal mesh as the support surface forming material provides a convenient means for accommodating equipment tiedowns. On the other hand, when solid sheets are used for the deck surface, appropriate loops or the like can be incorporated therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An equipment deck for pickup truck boxes and the like for increasing the effective loading area thereof, said deck being substantially flat and of a generally rectangular configuration, conforming in shape to the pickup box, and support means engaged with the deck and extending vertically therefrom for engagement with a portion of a pickup box in a manner so as to support the deck in an elevated position therein, overlying wheel housings, said deck having side edges and end edges, said support means comprising a pair of leg units parallel to and inwardly spaced from said side edges and providing overhanging side deck portions laterally outward of each leg unit whereby upon an engagement of the leg units with the bed of a pickup box inward of the sides thereof, the overhanging portions of the deck will overlie side located wheel covers or the like and provide a continuous support surface between the sides of the pickup box, each leg unit extending longitudinally along the deck and comprising a full length base bar, a plurality of vertical legs engaged between the base bar and the overlying deck at spaced points therealong, and a plurality of leg braces extending at an angle from the base bar to the overlying deck, said deck comprising a rigid peripheral frame and a rigid meshlike sheet overlying said frame and providing a support surface, one end edge of said deck having bracket means provided therealong, and an elongated ramp having one end selectively engaged with said bracket means for an extension of the ramp between the end of the deck, when mounted on a pickup box, and the ground.

2. The structure of claim 1, wherein said ramp is narrower than said deck and alignable at selected points along the end edge of the deck having the bracket means thereon.

3. The structure of claim 2, wherein said bracket means comprises a plurality of individual brackets, each bracket including a leg fixed to the corresponding end edge of the deck and projecting laterally outward therefrom, and a flange rigid therewith and projecting upwardly from the outer end thereof, said ramp, at the one end engaged with the bracket means, including a downwardly directed angle bar engageable over the upwardly directed flanges of selected ones of the brackets.

4. The structure of claim 3, wherein said ramp includes elongated rigid angle bar siderails, said siderails including vertical full length flanges, said ramp further including a meshlike rigid supporting surface positioned between the siderails, the vertical flanges on the ramp siderails projecting above the supporting surface, and a plurality of gripping members provided over said supporting surface on said ramp between the siderails thereof.

5. An equipment deck for pickup truck boxes and the like for increasing the effective loading area thereof, said deck being substantially flat and of a generally rectangular configuration, conforming in shape to the pickup box, and support means engaged with the deck and extending vertically therefrom for engagement with a portion of a pickup box in a manner so as to support the deck in an elevated position therein, overlying wheel housings, said deck being provided with opposed side edges and opposed end edges, one end edge of said deck having bracket means provided therealong, and an elongated ramp having one end selectively engaged with said bracket means for an extension of the ramp between the end of the deck, when mounted on a pickup box, and the ground.

6. The structure of claim 5, wherein said ramp is narrower than said deck and alignable at selected points along the end edge of the deck having the bracket means thereon.

7. The structure of claim 6, wherein said bracket means comprises a plurality of individual brackets, each bracket including a leg fixed to the corresponding end edge of the deck and projecting laterally outward therefrom, and a flange rigid therewith and projecting upwardly from the outer end thereof, said ramp, at the one end engaged with the bracket means, including a downwardly directed angle bar engageable over the upwardly projecting flanges of selected ones of the brackets.

8. The structure of claim 7, wherein each bracket is angled with the upwardly projecting flange terminating in outwardly and downwardly spaced relation relative to the upper surface of the deck.

9. An equipment deck for pickup truck boxes and the like for increasing the effective loading area thereof, said deck being substantially flat and of a generally rectangular configuration, conforming in shape to the pickup box, and support means engaged with the deck and extending vertically therefrom for engagement with a portion of a pickup box in a manner so as to support the deck in an elevated position therein, overlying wheel housings, said support means comprising a plurality of hangers engageable with said deck along the opposed sides thereof and adapted for engagement with the opposed sides of a pickup box, each of said hangers comprising a vertically elongated member having an inwardly and upwardly hooking lower portion thereon for engagement with the deck, and an outwardly and downwardly hooking upper portion thereon for engagement with an adjacent pickup box sidewall.

10. An equipment deck for pickup truck boxes and the like, and a loading ramp therefor, said deck being of a generally rectangular configuration, conforming to the shape of a pickup box, and support means engaged with the deck and extending vertically therefrom for engagement with a pickup box in a manner so as to support the deck in an elevated position therein, said deck having side edges and end edges, one of said end edges having bracket means therealong, said ramp extending longitudinally outward from the bracket means so as to provide an access means for the movement of equipment onto and off of said deck, said ramp being relatively narrower than said deck and laterally adjustable along the one edge thereof provided with said bracket means, said bracket means being orientated so as to accommodate the ramp at adjusted positions laterally along the corresponding end edge.